United States Patent [19]

Grummer et al.

[11] Patent Number: 4,635,075

[45] Date of Patent: Jan. 6, 1987

[54] THERMAL PRINT HEAD AND PROCESS FOR PRODUCING

[75] Inventors: William L. Grummer, Canyon Country; Clifton A. Blake, Jr., Pasadena, both of Calif.

[73] Assignee: Datametrics Corporation, Chatsworth, Calif.

[21] Appl. No.: 804,543

[22] Filed: Dec. 4, 1985

[51] Int. Cl.$^4$ .............................................. G01D 15/10

[52] U.S. Cl. ................................ 346/76 PH; 400/120; 219/543; 338/308

[58] Field of Search ....................... 346/76 PH, 139 C; 400/120; 219/216 PH, 543; 338/306-311

[56] References Cited

FOREIGN PATENT DOCUMENTS 109424 4/1981 Japan .............................. 346/76 PH

*Primary Examiner*—Arthur G. Evans

*Attorney, Agent, or Firm*—Marvin H. Kleinberg

[57] ABSTRACT

An improved thermal printhead is disclosed which includes a plurality of addressable electrodes, each corresponding to a spot to be printed. In alternative embodiments, a single common electrode or a plurality of common electrodes are located in a plane below that of the addressable electrodes and are separated therefrom by an insulating layer. A portion of the common electrode is left exposed in the vicinity of each of the addressable electrodes and a covering of thermal resistive material electrically interconnects the two types of electrodes. Passage of a current through an addressable electrodes result in a current flow to the nearest points on a common electrode causing local heating in the resistive material. The electrode arrangement permits printing closer to the edge of the printhead and further, enables smaller, more clearly spaced printed "dots".

4 Claims, 7 Drawing Figures

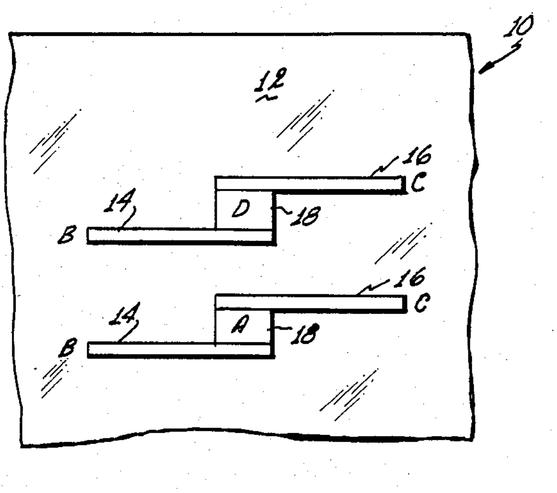
FIG. 1
PRIOR ART
FIG. 2
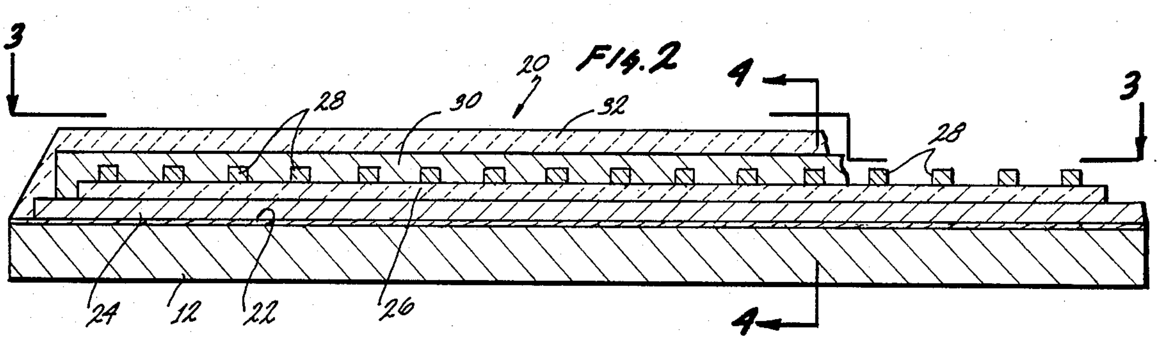
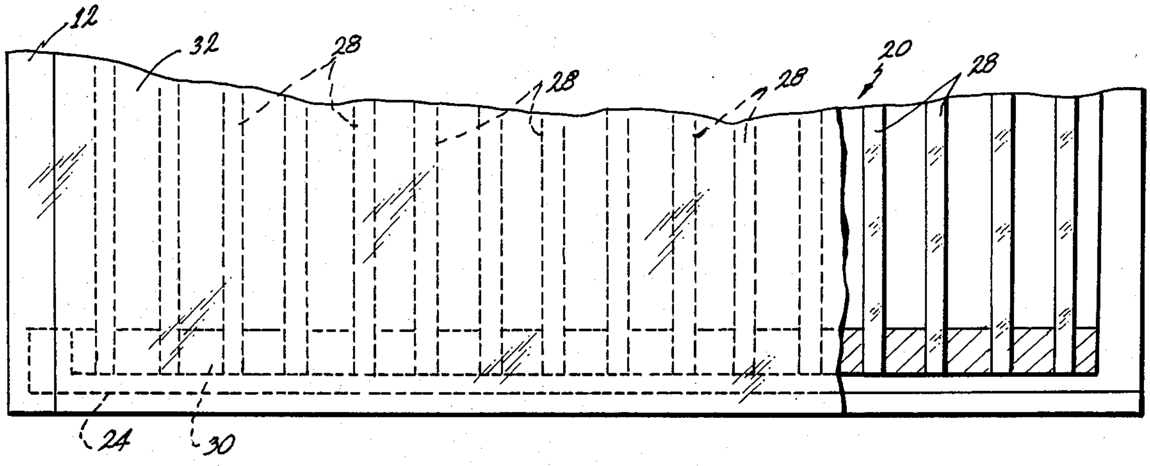
FIG. 3
FIG. 4
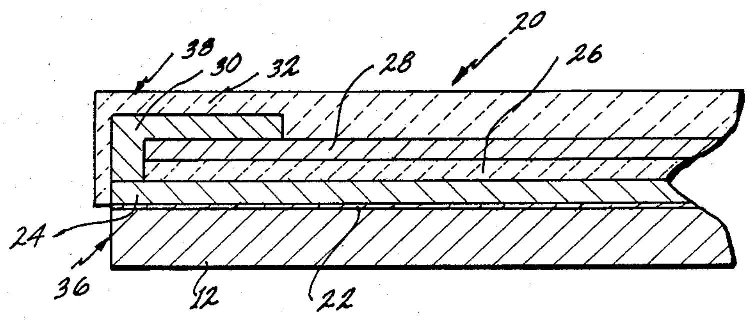

FIG. 5
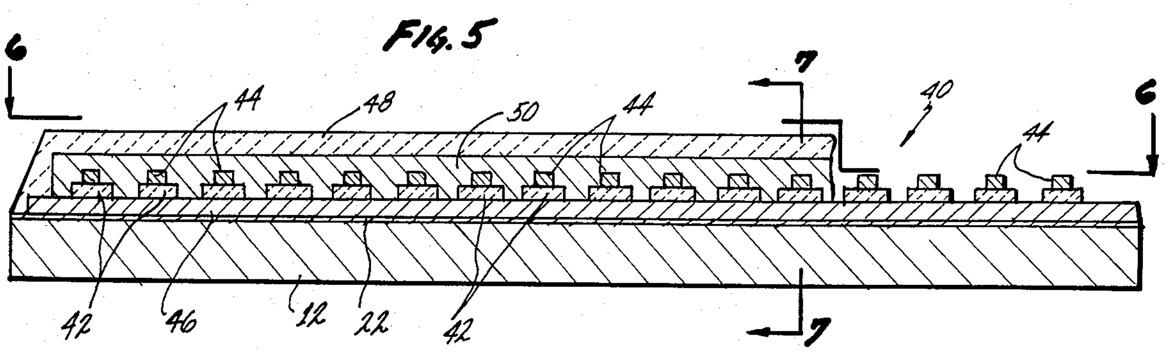
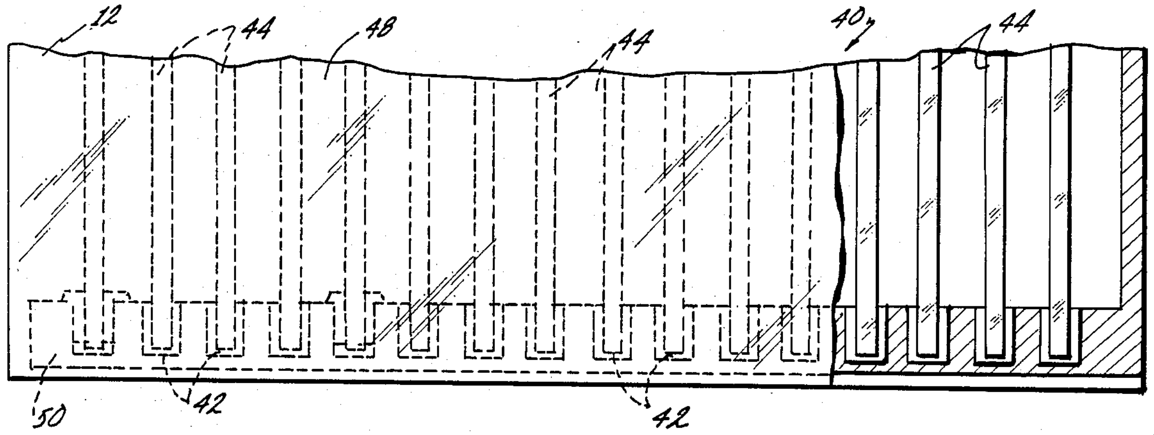
FIG. 6
FIG. 7
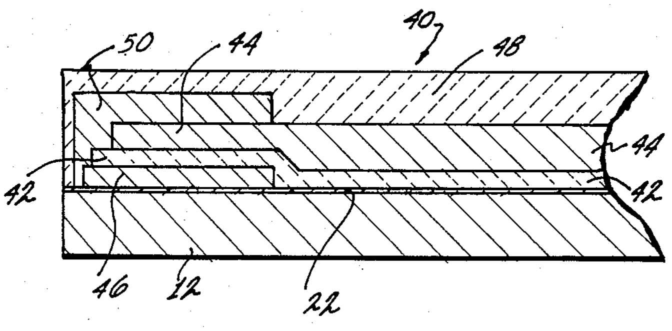

THERMAL PRINT HEAD AND PROCESS FOR PRODUCING

The present invention relates to thermal printers and, more particularly, to an improved print head for use in thermal printers and a process by which the print head can be produced.

PRIOR ART

Technology in thermal printers has made rapid strides in the last decade with the utilization of improved materials and techniques for creating thermal printheads. Such print heads permit higher and higher resolution of spot patterns that are created on the thermally sensitive media. Currently, dot matrix embodiments can provide dot densities between 100 and 300 per inch.

Prior art devices are disclosed, for example in the U.S. Pat. Nos. 3,903,393 to Stapleton et al,; 3,984,844 to Tanno et al,; 4,017,712 to Baraff et al,; 4,030,408 to Miwa,; 4,138,605 to Stapleton et al,; 4,203,025 to Nakatani et al,; 4,204,107, to Ohkubo et al,; 4,217,480 to Livermore et al,; and 4,250,511 to Stein et al,. All of these patents teach a thermal print head with a structure that includes electrode structures on both sides of a substantially horizontal, elongated thermal element that is a thick film resistive element. Applying a current between selected electrodes creates a current path through the thick film element, bridging the electrodes and generating heat sufficient to cause a color change in thermally sensitive paper.

In conventional thermal print heads, the electrodes are usually in a common plane overlying the substrate and the resistive thermal element is generally in substantially the same plane but may be sufficiently thick to extend above the level of the electrodes. The resistive thermal element is normally not of sufficient toughness to withstand the abrasion of the print media, therefore a protective "wear" layer must be provided. This can be accomplished in several ways.

A protective layer of a glass like material can be applied covering the electrodes and the resistive element so that an elevated printing bar is provided which may be segmented but which need not be.

An additional layer of material can be applied on top of the resistive element only, consisting of substantially the same material but of a much higher electrical resistance. These materials tend to be harder as the resistance increases due to a higher concentration of glass like filler material. The second layer has little or no affect on this function. Due to its greater physical hardness it serves only as a "wear" layer.

The need to have electrodes extending from both sides of the thick film element has imposed limitations on the placement of the print heads in the printer and on the versatility of the printer itself. Further, the current print head designs generally result in a spot size that limits the dot density to areas that approximate the area of the current path between the electrodes.

SUMMARY OF INvENTION

It would be desirable to have a thermal print head that could be placed in virtually any location in a printer. In addition, it would be advantageous to have a print head that could provide greater dot densities than are currently available. Such features have been provided in an improved print head according to the present invention.

An insulating substrate is provided with a first, non conducting layer to control the thermal resistance of the print head. A common electrode, which will be substantially parallel to the printing area is deposited over this non conducting layer. An insulating layer is next deposited over the non conducting layer and over most of the common electrode. However, a portion of the common electrode is exposed. A plurality of individually addressable printing electrodes are deposited over the insulating layer, generally at right angles to the common electrode and isolated therefrom. It is a matter of design choice whether the printing electrodes extend over the full width of the common electrode or only a portion thereof, so long as the electrodes are not in contact.

A resistive element is next deposited, substantially overlying the common electrode and the printing electrodes. In different embodiments, the resistive element can be a relatively thin strip which essentially parallels the common electrode or can merely be a conductive bridge between the common electrode and the individual printing electrodes. In some embodiments where the common electrode is deposited adjacent the edge of the substrate, the resistive element will extend around the edge, permitting the edge or the end of the substrate to become the printing surface.

A protective coating, which may be a glassy material, encloses the entire assembly and acts as a wear resistive coating in the printing process. A conductive path exists in the resistive element between each of the printing electrodes and the common electrode which essentially bridges the insulating layer which separates them. Moreover, the current path is vertical, between different planes and the heat generated by the passage of current will create a "hot spot" which overlies the printing electrode at its intersection with the common electrode. In those embodiments wherein the edge of the substrate is the printing area, the size and shape of the spot can be controlled by the area of the electrodes that are in contact through the resistive layer.

In alternative embodiments, the insulating layer can be subdivided into individual insulating pads which underlie each printing electrode. In this embodiment, the current path can extend along the printing electrode for the width of the common electrode. In this embodiment, however, the shape of the individual insulating pads becomes critical since the spacing between pads generally determines the current path and the size and shape of the thermal "spot" that results when current flows between a printing electrode and the common electrode.

Moreover, the placement of the printing electrode upon the insulating pad can also determine the size and shape of the printed spot. If the electrode is positioned along one edge of the pad, then current will preferentially flow through the resistive material that separates the common electrode from the printing electrode along that edge and the relatively longer current path extending over a greater area of insulating pad would tend to have much less current and therefore may be insufficiently heated to produce a "mark" on the thermally sensitive medium.

In brief, it has been found that greater flexibility in print head placement and higher dot densities and/or greater resolution can be obtained by using a common electrode over a substrate, applying an insulative layer over a portion of the common electrode, applying a plurality of printing electrodes over the insulative layer with substantially vertical conducting paths available between each printing electrode and the common electrode, depositing a resistive layer over the structure to complete the conducting paths and depositing a protective, "wear" coating or layer over the resistive layer. The conductive path extends between the substantially horizontal planes that are parallel to the substrate and which include each of structural elements of the print head.

BRIEF DESCRIPTION OF DRAWINGS

Further advantages and features of the present invention will be more fully apparent to those skilled in the art to which the invention pertains from the ensuing detailed description thereof, regarded in conjunction with the accompanying drawings wherein like reference characters refer to like parts throughout and in which:

FIG. 1 is a top view of a typical prior art thermal print head;

FIG. 2 is an end section view of a thermal print head according to the present invention;

FIG. 3 is a top view of a section of the print head of FIG. 2, taken along line 3—3 in the direction of the appended arrows;

FIG. 4 is a side section view of the print head of FIG. 2, taken along line 4—4 in the direction of the appended arrows;

FIG. 5 is an end section view of an alternative embodiment of a print head according to the present invention;

FIG. 6 is a top sectioned view of the print head of FIG. 5, taken along line 6—6 in the direction of the appended arrows; and FIG. 7 is a side section view of the print head of FIG. 5, taken along line 7—7 in the direction of the appended arrows.

DETAILED DESCRIPTION

Turning first to FIG. 1, there is shown a prior art thermal print head 10 according to the prior art. On a substrate 12, a first electrode 14 and a second electrode 16 are deposited, spatially separated by a resistive element 18. As seen, the first electrode 14, which may be considered and individually addressable printing electrode extends in a first direction and the second electrode 16, which may be connected to a plurality of similar electrodes as a common electrode, extends in the opposite direction.

The two electrodes shown in FIG. 1 would result in a single printed mark as a result of current passing between the electrodes 14, 16 through the resistive element 18. The illustrated configuration could be repeated in a direction orthogonal to the alignment of the electrodes 14, 16 and a "print bar" of resistive material would be formed in the vertical direction, as shown in the drawing. However, the resulting "dots" might be interrupted unless each pair of printing and common electrodes 14,16, separated by the resistive element 18, were isolated from every other pair. Otherwise, the presence of the resistive element 18 which could connect a single first electrode 14 to the two adjacent second electrodes 16.

In other embodiments according to the prior art, the common electrodes 16 could be joined by a single bus bar which would extend in parallel to the print bar. Yet other embodiments of the prior art could have the electrodes extending in the same direction but there would be problems in the interconnection of the electrodes 14, 16 to their respective driving circuits and the density of the printed dots would be affected. Yet other embodiments could have the resistive element 18 applied in discontinuous fashion, joining only one first electrode 14 to each second electrode 16.

Turning now to FIG. 2, there is shown, in an end section view, a thermal print head 20 according to the present invention As in the prior art device, an insulative substrate 12 can be used which can be of the same material utilized in the prior art. A glazed non conductive coating 22 is placed over the substrate 12 to control the thermal resistance of the thermal print head 20. An extended, common electrode bar 24 is deposited on the non conductive coating 22 and extends for substantially the entire width that is selected for printing. An insulative layer 26 is deposited over the common electrode bar 24 and serves as the base for the deposition of a plurality of individual printing electrodes 28. A layer of resistive material 30, in a "line" whose width is substantially that of the height of the dot that is to be printed, is deposited on the common electrode bar 24, over the ends of the printing electrodes 28 and the insulative layer 24. A protective, wear layer 32 covers all of the deposited structure and serves as an effective insulator, as well.

In FIG. 3, the thermal print head 20 is shown from the top but sectioned below the resistive material 30 to reveal the structure and placement of the common electrode bar 24 and the printing electrodes 28 which are spatially separated by the insulative layer 24. The area of thermal heating which will result in a printed spot is indicated as the spot area 34. As can easily be seen, the spot area 34 extends on both sides of the printing electrodes 28 since conducting paths through the resistive material 30 will extend to the underlying common electrode bar 24 on both sides of each of the printing electrodes 28.

FIG. 4 is a side section view and better shows the the various elements and the spatial separation that is provided by the method of construction. More or less conventional semi conductor production techniques are employed in the step by step creation of the thermal print head 20 of the present invention. As can be seen in FIG. 4, the resistive material 30 can overlie the common electrode bar 24 and the printing electrodes 28 and extend to the edge 36 of the substrate 12. The wear layer 32 can cover the resistive material 30 and extend over the edge. In some applications, it may be desirable to "round off" the corner of the thermal print head 20 so that the printing surface 38 can be the end rather than the top of the substrate 12.

In producing the improved thermal print head 20 of the present invention, either silk screen printing techniques or photo resists can be used with etching and deposit steps, depending upon the materials to be used and the ultimate spot density desired. Using silk screen techniques, common electrode bar 24 is deposited and then fired to bond it to the substrate 12. The insulative layer 26 is next deposited and fired in place. The printing electrodes 28 can then be screened on and fired after which the resistive material 30 is applied. After the resistive material 30 is fired on, the wear layer 32 is applied and fired. The materials must be chosen so that a subsequent firing step does not adversely affect a previously applied component.

Photo chemical milling techniques, if employed, would involve successive steps of applying a photoresist compound over the substrate surface that had deposited upon it a material that could be etched. An appropriate mask is used to expose the photoresist material and a desired etching pattern is produced through which unwanted deposited material can be removed. This process is repeated for each layer of material until the composite structure is completed. Obviously, a combination of masking and etching steps coupled with printing steps can be employed in producing the thermal print head of the present invention.

Turning next to FIGS. 5–7, which are views substantially similar to those of FIGS. 2–4, an alternative thermal print head 40 is shown. The primary difference between the preferred embodiment of FIGS. 2–4 and the alternative embodiment of FIGS. 5–7 is that rather than utilizing a continuous insulating layer 26, the insulating layer is subdivided, either through etching, silk screening laser cutting techniques, into a plurality of individual insulator pads 42 which insulate each of the printing elect bars 44 from the common electrode bar 46. This can best seen in FIGS. 5 and 6 if the thermal resistive layer 50 omitted from the view of FIG. 6.

In FIG. 7, which is the side sectional view, it can be seen that the insulator pads 42 effectively isolate the printing electrode bars 44 from the common electrode bar 46 and yet affords a conducting path through a resistive layer 48 as best seen in FIGS. 5 and 6. The primary current path in this embodiment, would tend to be in the region that is between the selected printing electrode bar 44 and the adjacent, non-selected printing electrode bars 44 with the print spot 52 tending to overly the selected electrode 44.

As with the other embodiment, the structure is completed with the use of a protective or wear layer 48, which may be a glassy compound. It is possible to use the edge for printing in this embodiment, also and it is believed that the selection of the preferred or alternative embodiment would be dictated primarily by the application and the desirability of a potentially larger area printed spot since the alternative embodiment can utilize a conductive path that extends the full width of the common electrode bar while the preferred embodiment employs a conductive path that extends from the end of a printing electrode.

Thus there has been described and shown a novel arrangement for a thermal print head in two alternative embodiments. A common electrode is arranged in a first plane next adjacent the substrate. A non conductive coating may be interposed between the substrate and the common electrode to affect the thermal resistance of the structure. A plurality of separately addressable printing electrodes, in a second plane, overlie the common electrode and are electrically isolated therefrom by an insulating layer which, in separate embodiments, masks the common electrode except at the outer edge or takes the form of insulating pads which are approximately coextensive with the portion of the printing electrode that overlies the common electrode.

A "printing bar" of resistive material is then deposited to electrically interconnect the common electrode with each of the printing electrodes. As a current path is created between an energized printing electrode and the common electrode, a localized "hot spot" is generated along that path. In one embodiment, the conductive path is formed between the end of the printing electrodes and the edge of the common electrode from the first to the second plane. In an alternative embodiment, the conductive path extends between the planes along the edges of the printing electrodes.

In the first embodiment, the "printing" action would occur in a plane that was parallel to the surface of the substrate, perpendicular to the surface, or in some arrangements, at the edge of the substrate where the top and side intersects. The resulting printing head could then be used either in a "horizontal" or "vertical" orientation. In the other embodiment, the printing would take place along a line that is parallel to the plane of the surface. It may be seen that the spot size of each embodiment is a function of the size of the printing electrode and the conductive area that is in electrical communication with the common electrode through the resistive material.

Other variations and modifications within the scope of the present invention will appear to those skilled in the art. Accordingly, the invention should only be limited by the claims appended hereto.

What is claimed as new is:

1. A thermal printing head for thermally marking a thermally sensitive record material comprising:

a substrate member of low thermal conductive material having at least one planar surface;

a continuous common electrode bar of conductive material on said planar surface extending in a first direction parallel to one edge of said substrate member;

a continuous bar of insulative material overlying said bar of conductive material in a first plane parallel to said planar surface, said bar leaving an exposed margin of said conductive material extending in said first direction and adjacent said substrate edge;

a plurality of printing electrode bars of conductive material spaced from each other overlying said planar surface in a second plane, substantially parallel to said planar surface and extending in a direction orthogonal to said first direction, each of said printing electrode bars being insulated and isolated from said common electrode bar;

a resistive printing bar member overlying said exposed margin of said common electrode bar extending in a third plane, substantially parallel to said planar surface and in electrical contact with all of said individual printing electrode bars to provide interplanar conductive paths between said printing electrode bars and said common electrode bar; and a protective wear coating covering said resistive printing bar, said printing electrode bars and said common electrode bar to provide a printing surface whereby the passage of electrical current between a selected printing electrode and said common electrode bar through said printing bar resistive material produces a temperature rise at the printing surface sufficient to impart to thermally sensitive paper in contact therewith, a mark whose size and shape is determined by the temperature of the surface, the area of the electrical current path, the width of each printing electrode bar and the distance between adjacent printing electrode bars.

2. The thermal print head of claim 1, above, further comprising a non conductive layer in a plane between the upper surface of said substrate and said common electrode bar of conducting material to control the thermal resistance of the print head.

3. The thermal print head of claim 1, above, wherein said protective wear coating extends over the edge of said substrate adjacent said printing bar and whereby the printing surface is in a plane orthogonal to the plane of the surface of said substrate.

4. The thermal print head of claim 1, above, wherein said insulating bar is subdivided into discrete insulating pads, each underlying a one of said printing electrode bars and said resistive printing bar provides interplanar electrically conductive paths between said printing electrode bars to said underlying common electrode conducting bar whereby the printing marks that are produced are substantially centered over each printing electrode bar and are of a width comparable to the width of a printing electrode bar.

* * * * *